US010632964B2

(12) United States Patent
Gutierrez et al.

(10) Patent No.: US 10,632,964 B2
(45) Date of Patent: Apr. 28, 2020

(54) SEATBELT BUCKLE WITH BUILT-IN CUTTER

(71) Applicants: Wilson Gutierrez, Naples, FL (US); Oscar Escobar, Naples, FL (US)

(72) Inventors: Wilson Gutierrez, Naples, FL (US); Oscar Escobar, Naples, FL (US)

( * ) Notice: Subject to any disclaimer, the term of this patent is extended or adjusted under 35 U.S.C. 154(b) by 0 days.

(21) Appl. No.: 16/432,599

(22) Filed: Jun. 5, 2019

(65) Prior Publication Data

US 2019/0283705 A1    Sep. 19, 2019

Related U.S. Application Data

(63) Continuation-in-part of application No. 15/663,738, filed on Jul. 29, 2017, now abandoned.

(51) Int. Cl.
*B60R 22/32* (2006.01)
*B60R 22/18* (2006.01)

(52) U.S. Cl.
CPC ...... *B60R 22/32* (2013.01); *B60R 2022/1806* (2013.01); *B60R 2022/328* (2013.01)

(58) Field of Classification Search
CPC .............. B60R 22/32; B60R 2022/328; A44B 11/2546; A44B 11/005; B26B 11/00
See application file for complete search history.

(56) References Cited

U.S. PATENT DOCUMENTS

| | | | |
|---|---|---|---|
| 4,009,905 A | 3/1977 | Bejeannin | |
| 5,085,449 A | 2/1992 | Hudson | |
| 5,395,136 A | 3/1995 | Buchner | |
| 5,653,031 A * | 8/1997 | Richter | .............. B26B 27/00 30/280 |
| 6,148,520 A | 11/2000 | Berns | |
| 6,453,564 B1 | 9/2002 | Foley | |
| 8,608,247 B2 | 12/2013 | Roman | |
| 9,925,952 B2 | 3/2018 | Flegar et al. | |
| 10,214,170 B2 * | 2/2019 | Souders | ............... B60R 22/32 |
| 2004/0140142 A1 | 7/2004 | MacDougall | |
| 2006/0169120 A1 | 8/2006 | Smith | |
| 2008/0222900 A1 * | 9/2008 | Lee | ..................... B60R 22/32 30/298.4 |
| 2016/0221533 A1 * | 8/2016 | Flegar | .................. B60R 22/32 |

* cited by examiner

*Primary Examiner* — Robert Sandy
*Assistant Examiner* — Rowland Do
(74) *Attorney, Agent, or Firm* — Mark Terry

(57) ABSTRACT

A seatbelt buckle with cutter includes a latch element having a tongue-like protrusion with an aperture configured to be received by a belt buckle receiver, a middle element having a pull handle and a serrated cutting blade, a top cover configured for coupling to a top of the latch element a bottom cover configured for coupling to the bottom of the middle element, wherein when the top and bottom covers are coupled to the latch element and middle element, respectively, and the belt extends through the apertures of the patch element, middle element, and top and bottom covers, the blade is configured to cut the belt when the pull handle of the middle element is pulled.

1 Claim, 2 Drawing Sheets

SEATBELT BUCKLE WITH BUILT-IN CUTTER

CROSS-REFERENCE TO RELATED APPLICATIONS

This patent application is a continuation in part of patent application Ser. No. 15/663,738 filed Jul. 29, 2017 and entitled "Seat Belt Buckle With Built-In Cutter." The subject matter of patent application Ser. No. 15/663,738 is hereby incorporated by reference in its entirety.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The present invention relates to automotive systems, and more particularly, to lifesaving systems for automobiles.

BACKGROUND OF THE INVENTION

Seat belt restraints were first invented by an engineer named George Cayley to help keep pilots inside gliders. The first patented seat belt was created by Edward Claghorn 1885 in order to keep tourists safe in taxis in New York City. Over time, safety experts conducted research and demonstrated that such restraints prevented drivers and passengers from being ejected from vehicles thereby reducing injuries. Later in the 1950s, the Sports Car Club of America required race car drivers to wear lap belts during competitions and the Society of Automotive Engineers appointed a Motor Vehicle Seat Belt Committee to promote seat belt use for the general public. In 1966 the United States enacted the National Traffic and Motor Vehicle Safety Act of 1966 and required seat belts be installed in all vehicles sold within the country. In 1970, the world's first seat belt law was created in Australia, which required vehicle passengers to wear their seat belts at all times. Today, a majority of seat belts consist of a combination shoulder and lap belt releasably connected to a seat connector by means of a buckle on one side of a user and a retractor connected to the vehicle pillar on another side of a user. The release mechanism on these buckles usually consist of small, low-profile buttons and are discreet for comfort. Unfortunately, they can also be difficult to operate during an emergency because they can be difficult to find and need to be depressed at an angle facing a user. In some instances, users can become trapped in seat belts that malfunction in accidents or that fail to release when under extreme tension (such as when a driver is hanging in a belt upside down).

Engineers have started developing devices affixed to seat belts to release them quickly in such emergencies. U.S. Pat. No. 4,009,905A granted to Bejeannin disclosed a set of two cutting buckles for a seatbelt for the lap and chest belt. U.S. Pat. Nos. 5,085,449A, 6,148,520A, 20060169120A1, 20040140142A1 and 6,453,564B1 granted to Hudson, Berns, Smith, MacDougall and Foley respectively, disclosed external retrofit cutters for seat belts that are not affixed to the belt. U.S. Pat. No. 9,925,952B2 granted to Flegar and Dardinier disclosed a seat belt cutter that relies on heat to melt said belt. U.S. Pat. No. 5,395,136A granted to Buchner disclosed a seat buckle remover having two blades and not a single blade. U.S. Pat. No. 8,608,247B2 granted to Roman and Schwartz disclosed a shoulder strapping system for comfort but does not sever a belt. U.S. Pat. No. 5,653,031A granted to Richter disclosed a seat belt cutting device inside a protective cover located on a belt that requires a user to first open the case to gain access to cutter. While many of these patents incorporate various forms of cutting blades in their inventions, none were found to provide easy access to a cutting device.

Consequently, a need exists to overcome the problems with the prior art, and particularly for a more efficient way of providing system and method of releasing a seatbelt in dangerous circumstances.

SUMMARY OF THE INVENTION

Briefly, according to an embodiment of the present invention, a seatbelt buckle with cutter is disclosed. A seatbelt buckle with cutter comprises a latch element having a planar shape with a distal end having: 1) a tongue-like protrusion having a square shape, the tongue-like protrusion having an aperture configured to be received by a belt buckle receiver, and 2) an aperture configured for allowing a belt to extend therethrough, a middle element having a planar shape and configured for resting below the latch element, the middle element including: 1) a pull handle having a square shape, 2) an aperture configured for allowing the belt to extend therethrough and 3) a serrated cutting blade at a distal end of the aperture, the blade having curved radii at each end, a top cover configured for coupling to a top of the latch element so as to substantially cover the latch element except for the tongue-like protrusion, the top cover including an aperture configured for allowing the belt to extend therethrough, and a bottom cover configured for coupling to the bottom of the middle element so as to substantially cover the middle element except for the pull handle, the bottom cover including an aperture configured for allowing the belt to extend therethrough, wherein when the top and bottom covers are coupled to the latch element and middle element, respectively, and the belt extends through the apertures of the patch element, middle element, and top and bottom covers, the blade is configured to cut the belt when the pull handle of the middle element is pulled.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings. Additionally, the left-most digit of a reference number identifies the drawing in which the reference number first appears.

DETAILED DESCRIPTION

Figure 2:
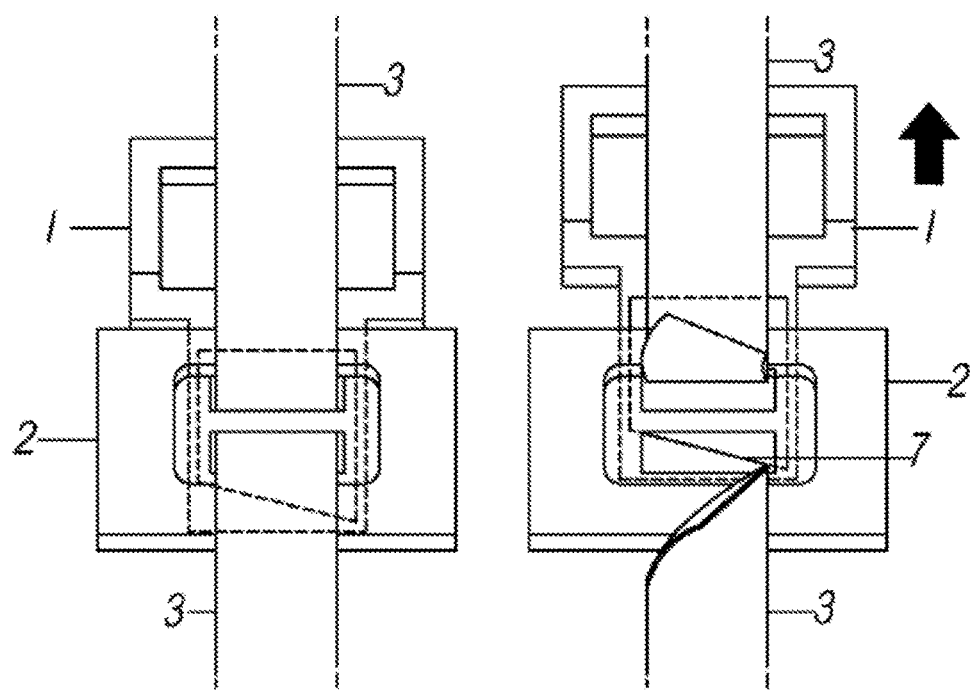
FIG. 2 is an illustration of a front view of the seatbelt with cutter, according to one embodiment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

The device herein disclosed and described provides a solution to the shortcomings in the prior art through the disclosure of a seat belt buckle that severs a seatbelt in an emergency. An object of the invention is to allow a user to escape from a defective seat belt in an emergency. Should a problem occur with the conventional buckle portion of the invention, the user can easily access the pull handle and sever the belt.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 1:
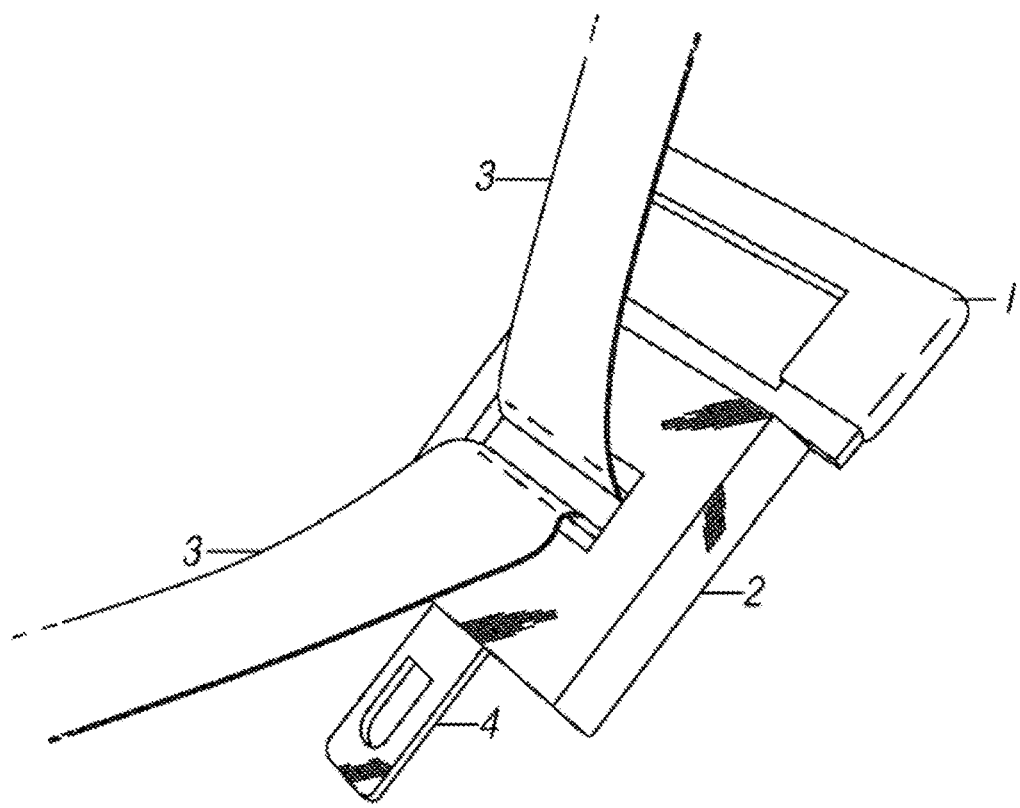
FIG. 1 is an illustration of a perspective view of a seatbelt with cutter, according to one embodiment.

FIG. 1 shows a perspective view embodiment of the invention installed on a seat belt and having three main parts: a buckle housing 2 (made of a rigid material such as, but not limited to plastic, metal, plastic, and the like), a latch 4 (comprised of, but not limited to metal, plastic, etc.) and a handle 1 (also being comprised of, but not limited to metal, plastic, and the like). Said invention having two proximal, rectangular slots configured to receive belt 3 therein.

FIG. 2 shows a front view embodiment of the invention severing a belt 3. As handle 1 is raised by a user using his fingers or hand, the handle 1 pulls cutting blade 7 into contact with said belt 3, allowing it to be cleanly severed.

Figure 3:
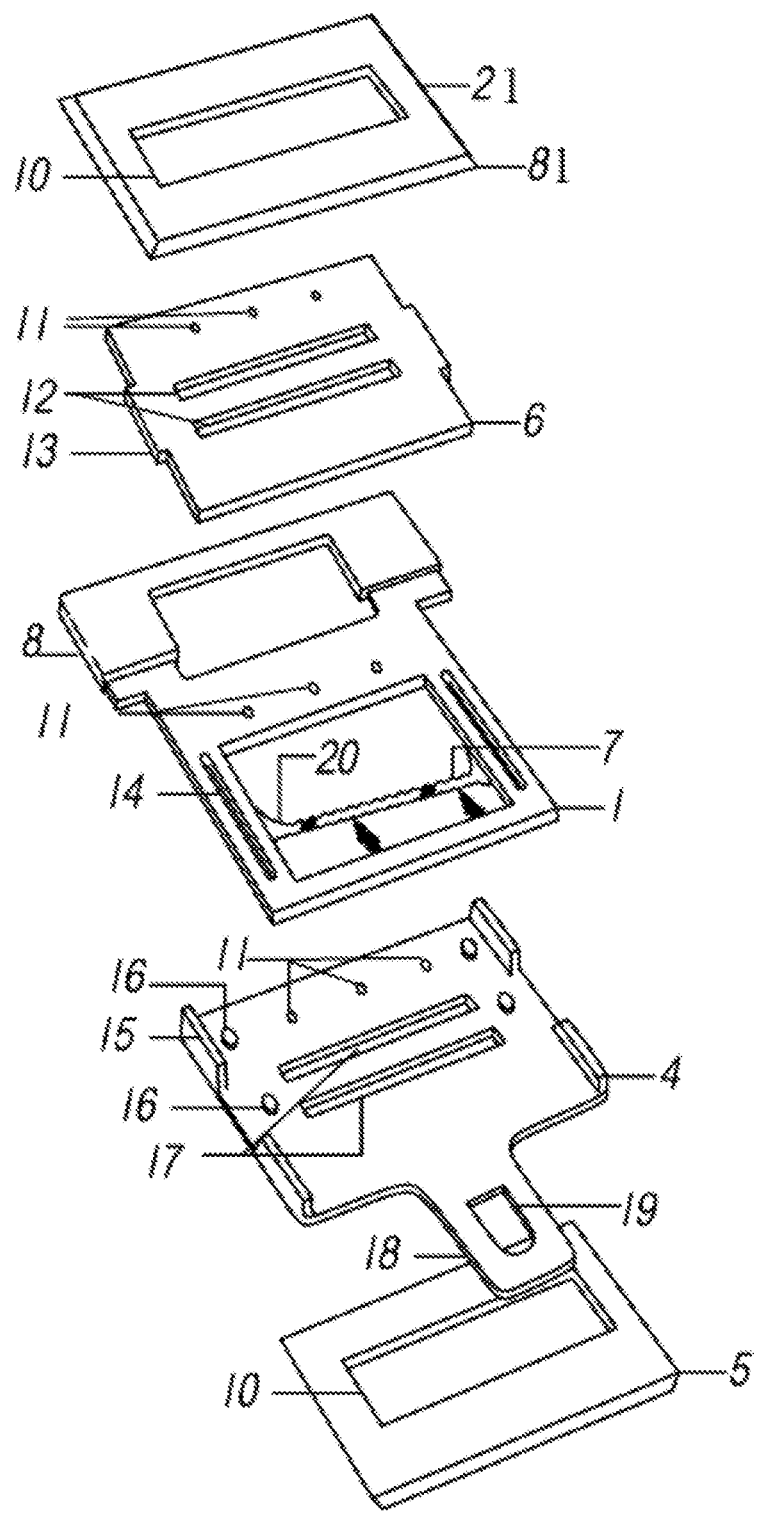
FIG. 3 is an illustration of a perspective view of the disassembled seatbelt with cutter, according to one embodiment.

FIG. 3 shows a perspective exploded view of the invention having several components that are sandwiched together therebetween. The figure showing latch 4 being planar and having a general rectangular shape with a distal end having a protrusion with latch tongue 18 including a square shape and aperture 19 configured to be received by a conventional belt buckle receiver therein. Said latch 4 (or latch element) having at least two belt loop openings 17 disposed along the longitudinal axis (to receive belt 3); four raised, cylindrical-shaped guide pins 16, at least three cover holes 11 on another distal end and four raised sidewall supports 15 on distal perimeter edges thereatop.

FIG. 3 shows handle 1 having a square shape also being made of, but not limited to metal, plastic, and the like and having pull handle 8 coated with a rigid yet flexible material such as but not limited to, rubber, plastic, and the like. A proximal portion of handle 1 having a square aperture configured to receive belt 3 and a distal end having a serrated cutting blade 7 fixedly connected therein. The blade having curved radii 20 at each distal end of at least six millimeters and chamfered cutting edges with at least a five-degree rake thereon. The figure also shows at least three cover holes 11 on another distal end and two rectangular-shaped track apertures 14 perpendicular to the longitudinal axis to receive the aforementioned guide pins 16 (of latch 4) as well as at least three cover holes 11. The entire element comprising the elements 1 and 8 are also referred to the middle element.

FIG. 3 further shows securement plate 6 having a rectangular shape and made of a rigid material such as metal, plastic and the like with two portions 13 extended on each distal end to be received by said sidewall supports 15 on latch 4. Plate 6 being affixed to said latch 4 allowing handle 8 to be slidably affixed therebetween. The figure also showing plate 6 having at least two rectangular apertures 12 to receive belt 3 as well as at least three cover apertures 11 thereon.

FIG. 3 finally showing cover plates 21 and 5 (also referred to as the top and bottom covers) being made of, but not limited to a lightweight, rigid material such as but not limited to plastic or metal and having a rectangular shaped aperture 10 to receive belt 3 and having a chamfered perimeter 81. Said covers having, but not limited to three molded pins, screws etc. on each inwardly facing surface to be received by cover holes in said components 6, 1 and 4 sandwiched therebetween.

The claimed device improves over the prior art for a variety of reasons, including the fact that is built into the belt buckle, i.e., it is not an add-on device or an aftermarket device that is added to an already existing seatbelt. Also, the claimed devices blade cuts the seat belt fabric horizontally, not vertically, which lessens the force needed to cut the belt. Also, the claimed device doesn't use springs, which makes a simpler design. The claimed device also uses a serrated blade with shark-tooth or serrated design across the full length of the belt to ensure point to point cutting across the entire width of the belt. The serrated blade better penetrates the belt fabric first for an easy and clean cut that uses a minimal force to accomplish its purpose. The claimed device also does not use any external elements to cut the belt (the blade is internal), and the semi-circular shape between the serrated design makes the cutting of the belt soft and easy.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

We claim:

1. A seatbelt buckle with cutter, comprising:
   a latch element having a planar shape with a distal end having: 1) a tongue-like protrusion having a square shape, the tongue-like protrusion having an aperture configured to be received by a belt buckle receiver, and 2) an aperture configured for allowing a belt to extend therethrough;
   a middle element having a planar shape and configured for resting below the latch element, the middle element including: 1) a pull handle having a square shape, 2) an aperture configured for allowing the belt to extend therethrough and 3) a serrated cutting blade at a distal end of the aperture, the blade having curved radii at each end;
   a top cover configured for coupling to a top of the latch element so as to substantially cover the latch element except for the tongue-like protrusion, the top cover including an aperture configured for allowing the belt to extend therethrough; and
   a bottom cover configured for coupling to the bottom of the middle element so as to substantially cover the middle element except for the pull handle, the bottom cover including an aperture configured for allowing the belt to extend therethrough;
   wherein when the top and bottom covers are coupled to the latch element and middle element, respectively, and the belt extends through the aperture of the latch element, middle element, and top and bottom covers, the blade is configured to cut the belt when the pull handle of the middle element is pulled.

* * * * *